United States Patent [19]

Hirata et al.

[11] Patent Number: 4,679,473
[45] Date of Patent: Jul. 14, 1987

[54] SHEARING MACHINE

[75] Inventors: Tadashi Hirata, Yamato; Hidekatsu Ikeda, Hatano; Yoshitaka Arima; Yoshihiko Kashihara, both of Isehara, all of Japan

[73] Assignee: Amada Company, Limited, Japan

[21] Appl. No.: 668,837

[22] Filed: Nov. 6, 1984

[30] Foreign Application Priority Data

Nov. 9, 1983 [JP] Japan .................. 58-172285

[51] Int. Cl.⁴ .................. B23D 33/08; B23D 33/10; B23D 15/06
[52] U.S. Cl. .................. 83/157; 83/390; 83/624; 83/467 R; 83/694
[58] Field of Search .................. 83/380, 385, 393, 157, 83/624, 635, 582, 390, 467, 394, 395, 109, 694, 81, 632

[56] References Cited

U.S. PATENT DOCUMENTS

| 2,047,322 | 7/1936 | Hazelton | 83/467 X |
|---|---|---|---|
| 2,520,495 | 8/1950 | Dehn | 83/467 |
| 2,603,261 | 7/1952 | Williams | 83/467 X |
| 2,766,825 | 10/1956 | Pater et al. | 83/390 X |
| 2,820,518 | 1/1958 | Shumaker | 83/632 X |
| 3,371,569 | 3/1968 | Pearson et al. | 83/635 |
| 3,600,995 | 8/1971 | Hanni | 83/157 |
| 3,968,714 | 7/1976 | Kuchyt | 83/582 |
| 4,150,594 | 4/1979 | Pearson et al. | 83/167 |
| 4,246,816 | 1/1981 | Ivanoff | 83/157 |

Primary Examiner—Donald R. Schran
Attorney, Agent, or Firm—Wigman & Cohen

[57] ABSTRACT

A shearing machine is so arranged that the ram, when vertically moved, is resiliently guided by spring guides and is driven in such a manner as to be kept urged into contact with the guides. The shearing machine is provided with hold-down clamps which can firmly hold the work-sheet being sheared without damaging the work-sheet. A hydraulic pump for the the hold-down clamps is provided with a large diameter piston which will supply a large amount of flow under low pressure and damp the surge and a small diameter piston which will supply a small amount of flow under high pressure. The shearing machine is also provided with hold-up supports which will hold up the work-sheet being sheared to prevent the work-sheet from bending and curling. The shearing machine also has with a back gauge which can be used to set the widths or lengths into which the work-sheet is to be sheared but can be moved out of the way.

20 Claims, 6 Drawing Figures

4,679,473

SHEARING MACHINE

BACKGROUND OF THE INVENTION

1. Field of the Invention

The present invention relates to a shearing machine having a pair of upper and lower shearing blades for cutting or shearing sheet-like materials such as sheet metals.

2. Description of the Prior Art

As is well-known, the shearing machine for shearing sheet-like materials such as sheet metals comprises a pair of opposite upright plates, a pair of elongated upper and lower shearing blades and a work-table on which a work-sheet is fed and held to be sheared. The lower blade is horizontally fixed to the work-table, and the upper blade is held by a ram which is disposed to move up and down between the upright plates to move the upper blade toward and away from the lower blade. Also, a plurality of hold-down means of hydraulic or pneumatic cylinders are provided at the front portion of the shearing machine for holding the work-sheet to be sheared on the work-table, and furthermore a back gauge means is provided to set the widths or lengths into which the work sheet is to be sheared.

Another problem with regard to the conventional shearing machine has been that the hydraulic or pneumatic hold-down means for holding the work-sheets to be sheared will virtually strike the work-sheets onto the work-table, since high pressure is abruptly urged in the hold-down means. Therefore, it has been very disadvantageous that tremendous noises will be produced when the work-sheets are being held by the hold-down means and furthermore the work-sheets will be damaged by the hold-down means.

Another disadvantage with the conventional shearing machine has been that the work-sheets, which are wide and long, will bend and curl to become undesirable shapes, since they cannot be perfectly held when being sheared.

It has been further disadvantageous with regard to the conventional shearing machine that the back gauge means will be in the way when a work-sheet is to be sheared into an irregular size without need of the back gauge means while other work-sheets are being continuously sheared into a certain size.

SUMMARY OF THE INVENTION

It is an object of the present invention to provide a shearing machine in which the ram can be accurately and smoothly moved up and down with a simple arrangement without need of troublesome adjustment. To attain this object, the shearing machine is so arranged that the ram, when vertically moved, is resiliently guided by spring means and is driven by driving means in such a manner as to be kept urged into contact with the guide means.

It is another object of the present invention to provide a shearing machine with hold-down means which can firmly hold the work-sheet being sheared without producing noises and damaging the work-sheet. To attain this object, a hydraulic pump means for the hold-down means is provided with a large diameter piston which will supply a large amount of flow under low pressure and damp the surge and a small diameter piston which will supply a small amount of flow under high pressure.

It is a further object of the present invention to provide a shearing machine which can perform shearing operations to produce fine workpieces without bending and curling. For this purpose, the shearing machine is provided with hold-up means which will upwardly hold up the work-sheet being sheared to prevent the work-sheet from bending and curling.

It is a still further object of the present invention to provide a shearing machine with a back gauge means which can be used to set the widths or lengths into which the work-sheet is to be sheared but can be moved out of the way to enable a work-sheet to be sheared into a different size.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENT

Figure 1:
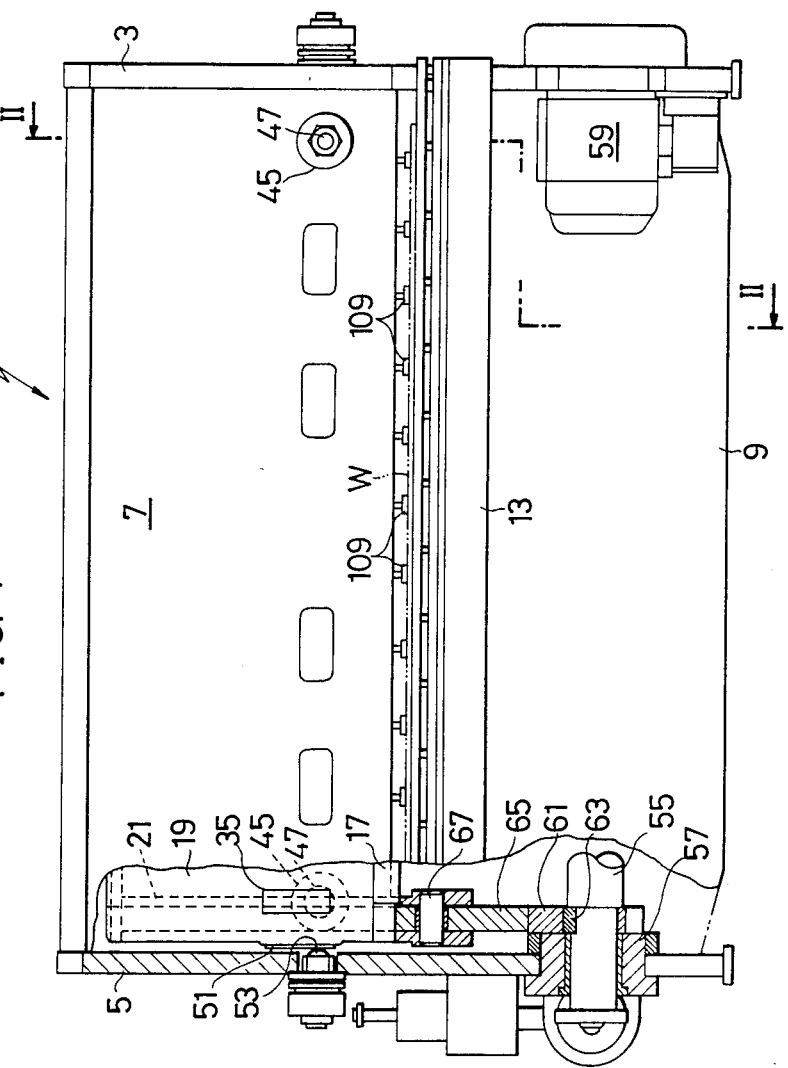
FIG. 1 is a front elevational view of a shearing machine embodying the principles of the present invention, and it is shown partially in section taken along the line I—I of FIG. 2.
Figure 2:
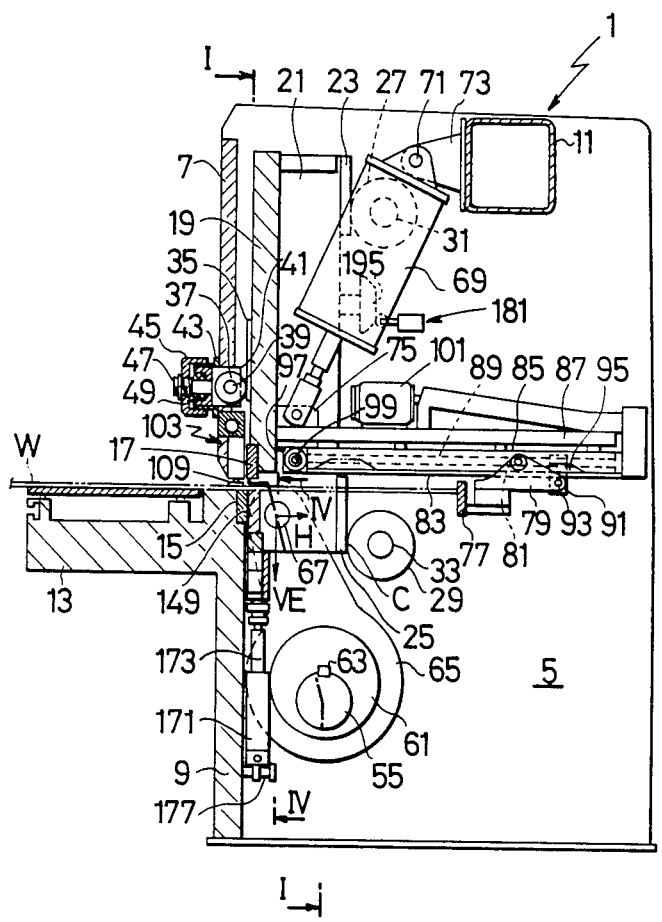
FIG. 2 is a sectional view taken along the line II—II of FIG. 1.

Referring to FIGS. 1 and 2, there is shown a shearing machine 1 which is constructed of a pair of upright plates 3 and 5, an upper front plate 7, a lower front plate 9 and a beam member 11. The upright plates 3 and 5 are vertically disposed in parallel with each other and are integrally connected with each other by the upper and lower front plates 7 and 9 and the beam member 11. The upper and lower front plates 7 and 9 are vertically fixed to the upper and lower front portions, respectively, of the upright plates 3 and 5, and the beam member 11 is horizontally fixed between the rearward top portions of the upright plates 3 and 5. Also, the shearing machine 1 is provided with a work-table 13 which is horizontally fixed to the top end of the lower front plates 9 in such a manner as to forwardly project so that a work-sheet W to be sheared can be fed thereon.

As shown also in FIGS. 1 and 2, an elongated lower blade 15 is detachably fixed horizontally to the back edge of the work-table 13 on the top of the lower front plate 9, and also an elongated upper blade 17 is detachably fixed to a ram 19 which is vertically movable between the upright plates 3 and 5. As is conventional, the upper and lower blades 17 and 15 are so arranged as to cooperate with each other to shear the work-sheet W when the ram 19 is lowered to lower the upper blade 17. Particularly, the ram 19 is of a square plate-like member which is formed at its lower end with an elongated slope, and the upper blade 17 fixed aslant to such a slope to provide a rake angle. Also, the ram 19 is provided at its rear edges with a pair of vertical ribs 21 which are symmetrically projecting rearward and also are projecting downward from the lower end of the ram 19 below the level of the top surface of the work-table 13.

As shown in FIG. 2, in order to guide the vertical movement of the ram 19, a pair of upper guide plates 23 and a pair of lower guide plates 25 are fixed to the ribs 21 of the ram 19, and a pair of upper guide rollers 27 and a pair of lower guide rollers 29 are provided on shafts 31 and 33, respectively. The upper and lower guide plates 23 and 25 are vertically fixed to the upper and lower ends, respectively, of the ribs 21 of the ram 19 in such a manner as to extend longer than the stroke length of the ram 19. The upper and lower guide rollers 27 and 29 are freely rotatably disposed on the shafts 31 and 33 in a manner such that they will be always kept in rolling contact with the upper and lower guide plates 23 and 25, respectively, when the ram 19 is vertically moved. The shafts 31 and 33 of the guide rollers 27 and 29 are horizontally held on the upper an lower portions, respectively, of the upright plates 3 and 5 in vertical alignment with each other to keep always the upper and lower guide rollers 27 and 29 in contact with the upper and lower guide plates 23 and 25. Also, the shafts 33 for the lower guide rollers 29 are so provided that the lower guide rollers 29 will be in rolling contact with the lower guide plates 25 at a level designated by C which is lower than the level of the top surface of the work-table 13.

In order to keep the upper and lower guide plates 23 and 25 in contact with the upper and lower guide rollers 27 and 29, a pair of front guide plates 35 are vertically fixed to the front surface of the ram 19, and a pair of front guide rollers 37 are provided on the upper front plate 7 in rolling contact with the front guide plates 35. Each of the front guide rollers 37 is freely rotatably held by means of a shaft 39 on a holding means 41 which is horizontally movably disposed in a bore formed through the upper front plate 7. The outer end of the holding means 41 projecting from the upper front plate 7 is horizontally movably disposed in a casing 43 which is secured to the upper front plate 7 and is covered by a box nut 45. Also, in order to keep the respective front guide rollers 37 in contact with the respective front guide plates 35, an adjusting bolt 47 is horizontally disposed on the box nut 45 to extend horizontally toward the holding means 41, and a spring 49 is disposed around the bolt 47 to bias the holding member 41 rearwardly. Thus, the front guide rollers 37 are biased by the respective spring 49 into rolling contact with the front guide plates 35 to bias the ram 19 to keep the upper and lower guide rollers 27 and 29 in rolling contact with the upper and lower guide plates 23 and 25 so that the ram 19 can be accurately moved up and down without shaking. In this connection, it will be understood that only a single set of the front guide rollers 37 and the front guide plates 35 can be employed, although the two sets of them have been described as employed in the preferred embodiment.

Referring again to FIG. 1, in order to prevent the ram 19 from shaking laterally rightward and leftward when vertically moving, a pair of side guide plates 51 are vertically fixed to the both sides of the ram 19, and a pair of side guide rollers 53 are provided on the upright plates 3 and 5 in rolling contact with the side guide plates 51. The side guide plates 51 are disposed in the same manner as the front guide rollers 37 to cooperate with the side guide plates 51 to hold and stop the ram 19 from shaking.

In the above described arrangement, the ram 19 will be held and stopped from shaking by the upper and lower guide rollers 27 and 29, the front guide rollers 37 and the side guide rollers 53 when it is moving vertically to bring the upper blade 17 toward and away from the lower blade 15. Also, the guide rollers 27, 29, 37 and 53 are kept resiliently in rolling contact with the guide plates 23, 25, 35 and 51 of the ram 19 by the springs 49, and therefore there is no problem about the guide clearance of the ram 11. In this connection, however, it will be understood that some antifriction members can be employed instead of the guide rollers 27, 29, 37 and 53 to cooperate with the guide plates 23, 25, 35 and 51.

Referring further to FIGS. 1 and 2, in order to move the ram 19 up and down, a driving shaft 55 is horizontally disposed beneath the ram 19 between the upright plates 3 and 5. As a matter of importance, the driving shaft 55 is located beneath the ram 19 but a little more rearward than the vertical plane in which the ram 19 is vertically moved. The driving shaft 55 is held by the upright plates 3 and 5 by means of bearing means 57, and it is connected to a driving motor 59 in a conventional manner to drive the ram 19. The driving shaft 55 is provided at its opposite ends with a pair of eccentrics 61 each fixed thereto by a key 63, and the eccentrics 61 are connected by respective connecting rods 65 to the ribs 21 of the ram 19 by means of respective pins 67. More importantly, the pins 67 of the connecting rods 65 are located at a lower level than the level of the top surface of the work-table 13 but at a higher level than the point C where the lower guide rollers 29 will be in rolling contact with the lower guide plates 25. More particularly, the connecting rods 65 are pivotally connected to the eccentrics 61 and are pivotally connected to the ribs 21 of the ram 19 by the pins which are in horizontal alignment with each other. Thus, when the driving shaft 55 is driven by the driving motor 59, the eccentrics 61 will move the ram 19 up and down by means of the connecting rods 65 and the pins 67.

In the above described arrangement, a vertical component VE and a horizontal component H will act on the pins 67 of the connecting rods 65 when the ram 19 is lowered by the driving shaft 55 and the eccentrics 61. Thus, the ram 19 will have a tendency to be tilted clockwise in FIG. 2 by the moment of the horizontal component H about the point C where the lower guide rollers 29 will be in rolling contact with the lower guide plates 25, since the pins 67 are located higher than the point C. Also, the upper blade 17 will be subject to a vertical upward shearing resistance or reaction and a horizontal rearward component when shearing the work-sheet W in cooperation with the lower blade 15. Accordingly, the ram 19, when lowered by the driving shaft 55 and the eccentrics 61, will be urged rearward to press the upper and lower guide plates 23 and 25 to the upper and lower guide rollers 27 and 29 to lower without shaking the upper blade 17.

As shown also in FIG. 2, a balancing means 69, which is shown as an air cylinder in the preferred embodiment, is provided to bias the ram 19 in the upper rearward direction in order to enable the ram be smoothly raised. Particularly, the balancing means 69 is pivotally connected at its upper end by a pin 71 to the beam member 11 by means of a bracket 73, and it is also connected at its lower end to a bracket 75 fixed to the ram 19. Thus, the ram 19 can be not only smoothly raised but also accurately raised and lowered with the upper and lower guide plates 23 and 25 kept in contact with the upper and lower guide rollers 27 and 29.

As shown in FIG. 2, in order to set the widths or lengths into which the work-sheet W is to be sheared, an elongated back gauge 77 is horizontally provided at the back of the upper and lower blades 17 and 15 in parallel therewith so as to stop the work sheet W which is fed over the lower blade 15. The back gauge 77 is carried by a plurality of carriers 79 each having rollers 81 so that it may be moved horizontally toward and away from the lower blade 15. The carriers 79 are movably mounted, by means of the rollers 81, on rails 83 which are disposed on elongated supporting members 85 at right angles to the upper blade 17. The supporting members 85 are mounted in parallel with each other on the underside of a plate-like base member 87 which is horizontally fixed to the lower rear end of the ram 19 at right angles thereto in a cantilever manner. In order to move the carriers 79 on the rails 83, lead screws 89 having nut members 91 are rotatably provided on the supporting members 85 and are connected to the carriers 79 by means of the nut members 91. The carriers 79 are pivotally connected to the nut members 91 by means of pins 93 in a manner such that they can be swung upward about the pins 93 away form the level where the work-sheet W to be sheared is horizontally moved. Also, cams 95 are provided on the rails 83 in the proximity of the rear ends thereof so that the rollers 81 will ride thereon to enable the carriers 79 to be swung upward about the pins 93. More particularly, the cams 95 are so arranged as to be fitted in a number of bores on the rails 83 so that they can be removably placed onto any place on the rails 83 at discretion. The lead screws 89 are connected with each other by means of gear boxes and a shaft 99 to be simultaneously driven by a motor 101 to move the carriers 79 by means of the nut members 91.

In the above described arrangement, the back gauge 77 will be horizontally moved toward and away from the lower blade 15 with the carriers 79 by the lead screws 89 and the nut members 91 to set the widths or lengths into which the work-sheet W is to be sheared. Also, when the rollers 81 of the carriers 79 are brought onto the cams 95 on the rails 83, the carriers 79 will be upwardly swung about the pins 93 to bring the back gauge 77 out of the way from the level where the work-sheet W is horizontally moved. Thus, the back gauge 77 can be brought up by moving the carriers 79 onto the cams 95 from the rails 83 so that the work-sheet W can be moved further rearward to be sheared into a wider or longer workpiece. Also, it will be understood that the cams 95 can be adjustably moved to any place on the rails 83 so as to enable the back gauge 77 to be raised out of the way at any desired position on the rails 83.

Figure 3:
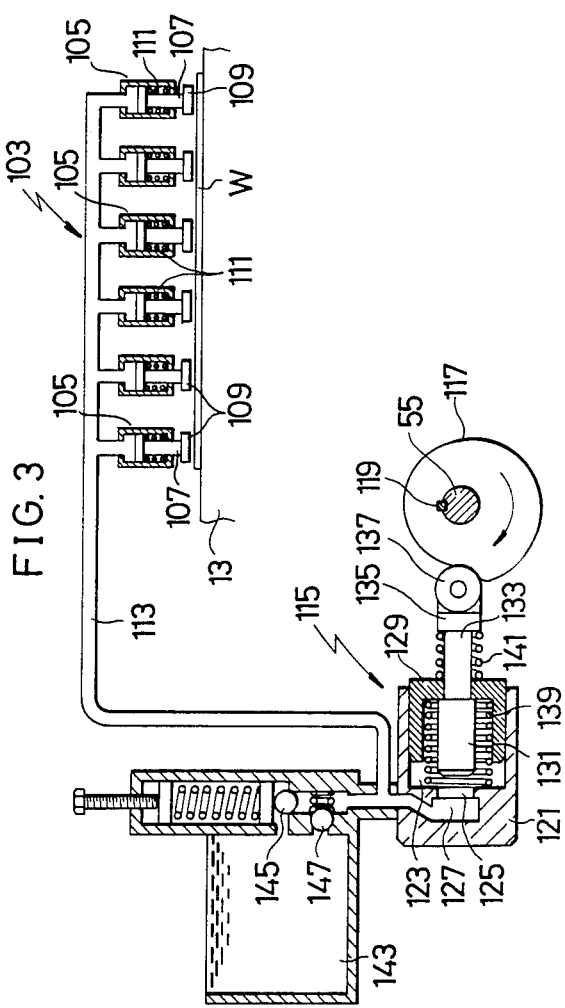
FIG. 3 is a diagrammatic view showing a hydraulic means and circuit of the shearing machine shown in FIGS. 1 and 2.

Referring to FIG. 3 in addition to FIGS. 1 and 2, a plurality of hold-down means 103 are mounted on the lower portion of the upper front plate 7 in a row to hold the work-sheet W to be sheared on the work-table 13. Each of the hold-down means 103 comprises a hydraulic cylinder 105, a piston and rod 107 which is vertically slidably disposed in the cylinder 105 and is provided at its lower end with a hold-down member 109, a spring 111 which is disposed in the cylinder 105 to bias the piston and rod 107 upwardly. The arrangement is such that the piston and rod 107 is downwardly urged by the hydraulic fluid against the spring 111 to enable the hold-down means 103 to hold down the work-sheet W to be sheared onto the work-table 13.

The hold-down means 103 are hydraulically connected by a pipe 113 to a pump means 115 which is driven by a cam 117 which is coaxially fixed to the driving shaft 55 for the ram 19 by a key 119 so as to rotate therewith. The pump means 115 is constructed of a casing 121 which is formed with a large diameter bore 123, a small diameter bore 125 connected to the large diameter bore 123 and a passage 127 connecting the small diameter bore 125 and the pipe 113. More particularly, the large diameter bore 123 is formed to be outwardly open, the small diameter bore 125 is formed in connection with the innermost end of the larger diameter bore 123 in axial alignment therewith and the passage 127 is formed to connect the innermost end of the small diameter bore 125 to the pipe 113.

In the casing 121 of the pump means 115, a cup-like piston 129 is slidably disposed in the large diameter bore 123, and a plunger 131 having a stem 133 is slidably mounted on the piston 129 so that it may be inserted into the small diameter bore 125. Particularly, the plunger 131 itself is disposed on the inner side of the piston 129, and the stem 133 is slidably inserted in a bore formed through the center of the piston 129 in a manner such that the stem 133 is outwardly projected from the piston 129. The stem 133 of the plunger 131 is provided at its outer end with a block 135 on which a cam follower 137 is rotatably disposed in rolling contact with the cam 117 on the driving shaft 55 for the ram 19. Also, a spring 139 is disposed in the large diameter bore 123 to bias the piston 129 outwardly, and another spring 141 which is stronger than the spring 139 is biased on the stem 133 of the plunger 131 between the piston 129 and the block 135 to urge the cam follower 137 into rolling contact with the cam 117.

The arrangement is such that the piston 129 is prevented from moving out of the large diameter bore 123 by the cam 117 by means of the cam follower 137, the block 135 and the spring 141 and the cam follower 137 will inwardly push the block 135, the stem 133 and the plunger 131 when the cam 117 is rotated by the driving shaft 55. Thus, when the cam 117 is rotated, the cam follower 137 will initially move the piston 129 inwardly against the spring 139 by means of the block 135 and the spring 141 which is stronger than the spring 139 until the piston 129 reaches its innermost limit. Then, after the piston 129 has reached the innermost limit, the cam follower 137 will move the plunger 131 inwardly into engagement with the small diameter bore 125 against the spring 141 as the cam 117 is further rotated. In this connection, the cam 117 is so arranged that it will cause the cam follower 137 to bring the plunger 131 to its innermost limit in the small diameter bore 125 just before the ram 19 is lowered by the driving shaft 55 to enable the upper blade 17 to shear the work-sheet W in cooperation with the lower blade 15. Also, of course the hydraulic fluid is supplied to prevail throughout the large diameter bore 123, the small diameter bore 125, the passage 127, the pipe 113 and all the hold-down means 103.

As shown also in FIG. 3, a reservoir 143 in which the hydraulic fluid is contained is connected to the pipe 113 by means of a relief valve 145 and a check valve 147. Thus, the hydraulic fluid can be drained from the pipe 113 into the reservoir 143 through the relief valve 145 and also can be supplied into the pipe 113 from the reservoir 143 through the check valve 147.

Figure 4:
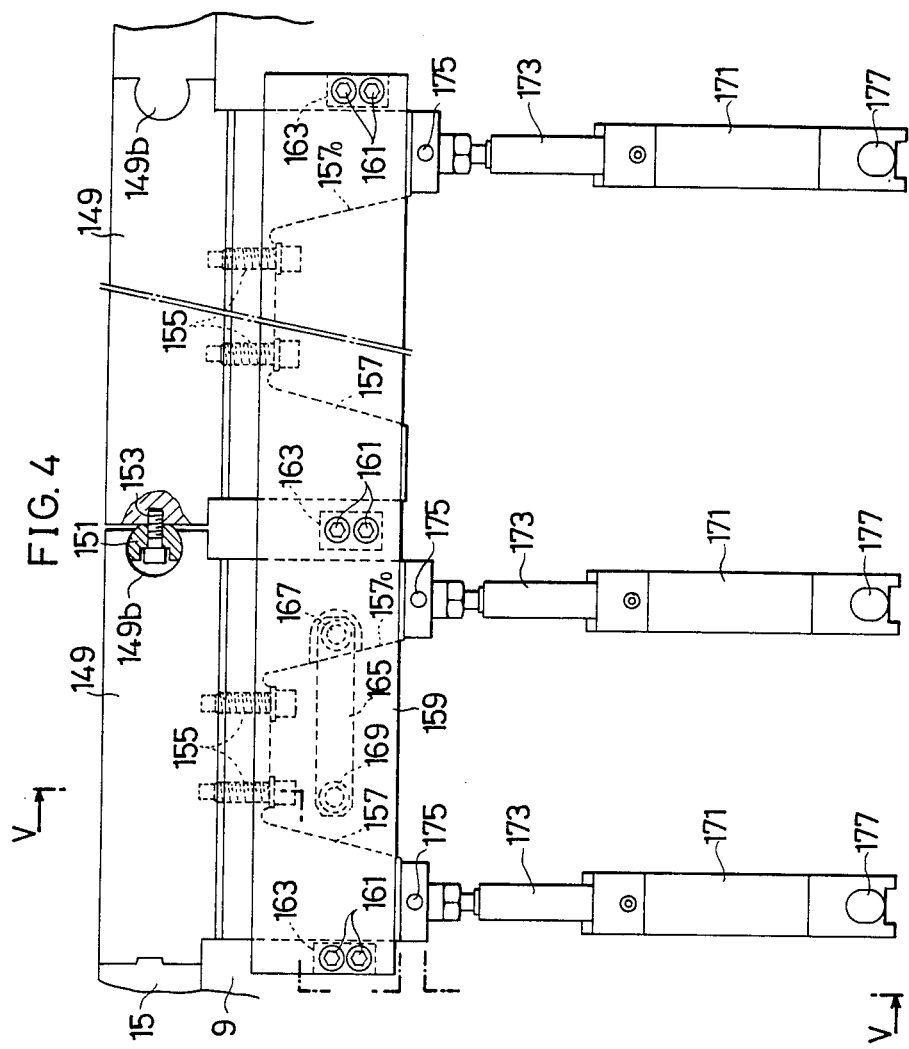
FIG. 4 is an enlarged sectional view taken along the line IV—IV of FIG. 2 with portions omitted.
Figure 5:
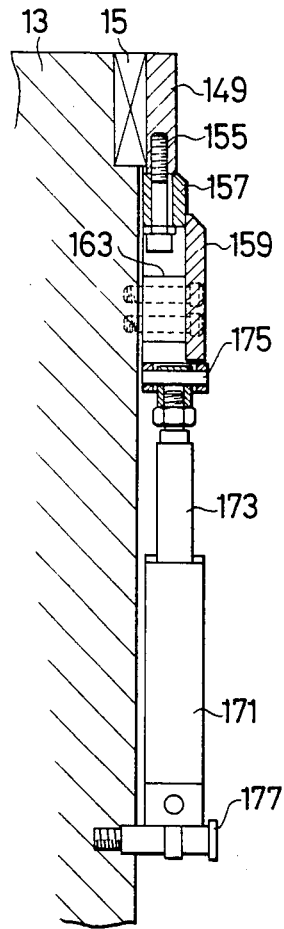
FIG. 5 is a sectional view taken along the line V—V of FIG. 4.

In the above described arrangement, each of the piston and rods 107 of the hold-down means 103 will be initially moved downwardly by a large amount of hydraulic fluid under low pressure from the pump means 115 when the piston 129 of the pump means 115 is inwardly moved in the large diameter bore 123. Accordingly, when the piston 129 is inwardly moved, the hold-down members 109 of the hold-down means 103 will lightly hold down the work-sheet W to be sheared onto the work-table 13 under low pressure with reduced noises and without damaging the work-sheet W. Also, the spring 141 of the pump means 115 will damp the surge which will occur in the hydraulic circuit when the hold-down members 109 are brought into contact with the work-sheet W to hold it down onto the work-table 13. After the piston 129 has reached its innermost limit in the large diameter bore 123 of the pump means 115, the plunger 131 will be moved in the small diameter bore 125, and the piston and rods 107 will be further urged downwardly by a small amount of hydraulic fluid under high pressure. Thus, the work-sheet W, which has been lightly held down onto the work-table 13 under low pressure, will be finally firmly held down by the hold-down members 109 under high pressure by the action of the plunger 131 without noises and also without being damaging by the hold-down members 109. Also, when the work-sheet W is being held down onto the work-table 13 by the hold-down members 109, the surplus hydraulic fluid will be drained into the reservoir through the relief valve 145. After the work sheet W has been firmly held down by the hold-down members 109, the ram 19 will be lowered by the driving shaft 55 to enable the upper blade 17 to shear the work-sheet W in cooperation with the lower blade 15. After the work-sheet W has been sheared by the upper and lower blades 17 and 15, the driving shaft 55 will raise the ram 19 and rotate further the cam 117 to enable the cam follower 137 and the springs 141 and 139 to move the plunger 131 and the piston 129 outwardly. After the work-sheet W has been sheared, the piston and rod 107 and the hold-down members 109 will be raised by the springs 111 to release the work-sheet W as the piston 129 and the plunger 131 are moved outwardly by the springs 139 and 141. Also, some amount of the hydraulic fluid will sucked into the pipe 113 from the reservoir 143 by the piston 129 and the plunger 131 which are moved outwardly by the springs 139 and 141. It is to be noted that pneumatic pump means can be employed instead of the hydraulic pump means 115 to embody the principles of the present invention. Referring to FIGS. 2, 4 and 5, a train of hold-up members 149, each being of an elongated square block, are provided just beneath the upper blade 17 at the back of the lower blade 15 in parallel therewith to upwardly hold up the work-sheet W to the upper blade 17 when the work-sheet W is being sheared by the upper and lower blades 17 and 15. The hold-up memebers 149 are so arranged as to hold up the work-sheet W being sheared in a manner such that the work-sheet W is held or gripped between the hold-up members 149 and the upper blade 17 as the upper blade 17 is lowered. Therefore, the hold-up members 149 are so arranged as to be moved up and down and also be tilted to comply with the motion of the upper blade 17 which is detachably fixed to the lower end of the ram 19 at an inclination or angle to the lower blade 15 to have a rake angle.

As shown in FIG. 4, each of the hold-up members 149 is formed at one of its ends with a horizontal cylindrical bore 149b which is partially notched into a more or less semi-cylindrical shape, and they are connected with each other by a joint block 151 fitting in the bore 149b by means of a bolt 153. More particularly, the hold-up members 149 are spaced from each other by a slight length, and the joint block 151 is fittingly engaged in the cylindrical bore 149b so that each of the hold-up members 149 can be swung about the joint block 151. Thus, the hold-up members 149 are connected with each other so that each of them can be tilted independently of the other to comply with the motion of the upper blade 17.

Each of the hold-up members 149 is fixed by a plurality of bolts 155 to one of carrier members 157, each of which is formed at its central portion with a C-shaped opening 157o facing or opening downwardly. The carrier members 157 are disposed at the back of the lower front plate 9 in slidable contact therewith so that it may be moved up and down and tilted rightward and leftward together with the hold-up members 149. In order to guide the movement of the carrier members 157, an elongated guide plate 159 is horizontally fixed to the back of the lower front plate 9 by a plurality of bolts 161 by means of a plurality of spacer blocks 163 each of which is located between the carrier members 157. Also, one of the carrier members 157 is pivotally connected to the back bf the lower front plate 9 by a link 165 which is pivoted at one of its ends to a portion of bne of the carrier members 157 by a pin 167 and is pivoted at the other end on a pin 169 which is spanned between the guide plate 159 and the back of the lower front plate 9. Thus, the carrier members 157 can be moved up and down and be tilted rightward and leftward between the guide plate 159 and the back of the lower front plate 9 and also between the spacer blocks 163 to enable the respective hold-up members 149 to comply with the movement of the upper blade 17.

In order to move the hold-up members 149 up and down, a plurality of hydraulic motors 171 each having a piston rod 173 are provided beneath the carrier members 157, and their piston rods 173 are pivotally connected to the carrier members 157 by pins 175. The hydraulic motors 171 are substantially vertically disposed with their piston rods 173 upwardly projected into connection with the carrier members 157, and they are pivotally mounted onto the back of the lower front plate 9 by means of pins 177 in such a manner as to be swung slightly rightward and leftward. Thus, the hold-up members 149 are held and moved up and down and also tilted rightward and leftward by the hydraulic motors 171 by means of the carrier members 157 to hold up the work-sheet W being sheared in compliance with the movement of the upper blade 17. In this connection, the hydraulic motors 171 are so arranged as to hold the hold-up members 149 on a level with the lower blade 15 so that the work-sheet W to be sheared may be horizontally placed on the lower blade 15 and the hold-up members 149, when the piston rods 173 are fully extended to their uppermost limits by the hydraulic fluid.

Figure 6:
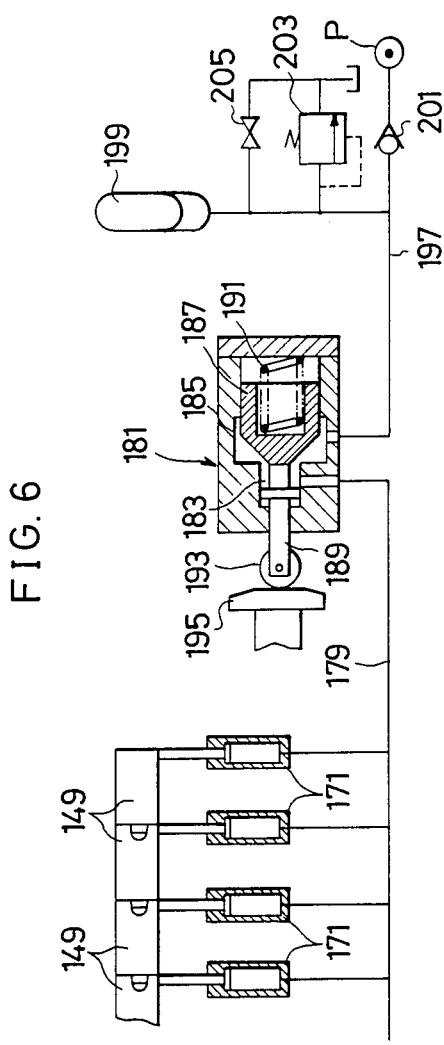
FIG. 6 is a diagrammatic view showing a hydraulic means and circuit.

Referring to FIG. 6, the hydraulic motors 171 are connected by a pipe 179 to a control valve 181 for controlling the hydraulic motors 171 in connection with the vertical movement with of the ram 19. The control valve 181 is formed with a small diameter bore 183 to which the pipe 179 is connected and is further formed with a large diameter bore 185 which is connected with the small diameter bore 183. The control valve 181 is provided with a spool 187 which is slidably inserted in the large diameter bore 185 in such a manner as to be movable so as connect and disconnect the small diameter bore 183 and the large diameter bore 185. The spool 187 is provided with a stem 189 slidably projecting out of the control valve 181 through a bore formed therethrough, and it is biased by a spring 191 to disconnect the small diameter bore 183 and the large diameter bore 185 and urge the stem 189 outwardly. The stem 189 of the spool 187 is provided at its outer end with a cam follower 193 which is rotatably disposed in rolling contact with a cam 195 which is provided on the ram 19. The arrangement is such that the spool 187 is moved against the spring 191 by the cam 195 by means of the cam follower 193 and the stem 189 to connect the small diameter bore 183 and the large diamter bore 185. Also, the cam 195 is so arranged as to cause the spool 187 to connect the small diameter bore 183 and the large diamter bore 185 when the ram 19 is in the proximity of its upper limit.

As shown also in FIG. 6, the large diameter bore 185 of the control valve 181 is connected to a pipe 197 which leads to an accumulator 199 and to a hydraulic source P via check valve 201. There is a relief valve 203 connected to the pipe 197, and also a cock 205 is provided in parallel with the relief valve 203 to manually drain the hydraulic fluid from the pipe 197.

In the above described arrangement, the spool 187 of the control valve 181 is kept pushed against the spring 191 by the cam 195 and the cam follower 193 to connect the large diameter bore 185 to the small diameter bore 183, when the ram 19 is at its uppermost limit. Therefore, when the ram 19 is at its uppermost limit, the hydraulic motors 171 will be supplied with the hydraulic fluid from the accumulator 199 and the hydraulic source P through the control valve 181 to hold the hold-up members 149 on a level with the lower blade 15 so that the work-sheet W to be sheared may be horizontally placed thereon. When the ram 19 is lowered to enable the upper and lower blades 17 and 15 to shear the work-sheet W, the hold-up members 149 will be pressed by the upper blade 17 to be lowered together with the workpiece sheared from the work-sheet W. When the hold-up members 149 are pressed by the upper blade 17, the piston rods 173 of the hydraulic motors 171 will drive and cause the hydraulic fluid to drain through the contol valve 181 against the spool 187 and the spring 191 into the accumulator 199 and the hydraulic source P through the relief valve 203 to enable the hold-up members 149 to be lowered. When the ram 19 to be raised after the work-sheet W has been sheared, the hold-up members 149 will be kept lowered without raising the workpiece sheared from the work-sheet W, since the spool 187 of the control valve 187 has been released from the pressure of the cam 195 to disconnect the small diameter bore 183 and the large diameter bore 185. Also, when the ram 19 is returned to its uppermost limit, the cam 195 will push the spool 187 of the control valve 181 by means of the cam follower 193 to supply the hydraulic fluid from the accumulator 199 and the hydraulic source P into the hydraulic motors 171 so that the hold-up members 149 can be raised for the next shearing. It is to be noted that pneumatic motors connected with a pneumatic source can be employed instead of the hydraulic motors 171 to embody the principles of the present invention.

Although preferred forms of the present invention have been illustrated and described, it should be understood that the devices are capable of modification by one skilled in the art without departing from the principles of the invention. Accordingly, the scopes of the invention are to be limited only by the claim appended hereto.

We claim:

1. A shearing machine, comprising:
   a frame;
   a work-table provided integrally on the frame;
   a lower blade detachably fixed to the work-table at the level of the work-table;
   an upper blade;
   a ram supported on said frame for vertical movement with respect to said lower blade, said ram holding the upper blade for performing shearing operations in cooperation with the said lower blade;
   upper and lower rear guide means provided on the frame to guide the upper and lower rear portions of the ram;
   front guide means supported on the frame above the work-table to guide the front portion of the ram;
   a driving means for driving the ram supported on the frame beneath the ram but slightly more rearward than the plane of the vertical movement of the ram; and
   connecting rod means connecting the driving means to the ram at a position which is higher than the lower guide means and lower than the front guide means.

2. A shearing machine according to claim 1 in which the guide means for guiding the ram are rollers.

3. A shearing machine according to claim 1 in which the guide means for guiding the ram are slidable members.

4. A shearing machine according to claim 1, wherein the lower rear guide means are located lower than the top surface of the work-table.

5. The shearing machine of claim 1, comprising:
   balancing means connected to the frame and to the ram for biasing the ram in the upward rear direction, said balancing means comprising a fluid-actuated piston and cylinder pivotally connected at the upper end thereof to the frame.

6. A shearing machine, comprising:
   a frame;
   a work-table provided integrally on the frame;
   a lower blade detachably fixed to the work-table at the level of the work-table;
   an upper blade;
   a ram supported on said frame for vertical movement with respect to said lower blade, said ram holding the upper blade for performing shearing operations in cooperation with the lower blade;
   a drive shaft supported on said frame;
   an eccentric fixed on said drive shaft connected with said ram for driving said ram;
   fluid motors for holding down a work-sheet provided at a front portion of the frame;
   pump means connected by a passage to the fluid motors wherein said pump means comprises;
   first means for supplying a large amount of flow under low pressure to the pump means;
   second means for supplying a small amount of flow under high pressure;
   said first flow supplying means comprising a first cylinder and a first piston and first resilient means biasing said first piston in a first direction relative to said first cylinder, a cam fixed on said drive shaft engaging said first piston for driving said first piston; and means for damping pressure surges, said damping means comprising second resilient means arranged to coact with said first piston for biasing said first piston in a second direction opposite said first direction.

7. A shearing machine according to claim 5, wherein said first piston is a hollow piston and said second flow supplying means comprises a second piston disposed coaxially within said first piston.

8. A shearing machine according to claim 6, including a cam follower connected to said first piston and adapted to engage said cam.

9. A shearing machine according to claim 6, wherein the force applied to said first piston by said second resilient means is greater than the force applied to said first piston by said first resilient means.

10. A shearing machine, comprising:
a frame;
a work-table provided integrally on the frame;
a lower blade detachably fixed to the work-table at the level of the work-table on the frame;
an upper blade;
a ram supported on said frame for vertical movement with respect to said lower blade, said ram holding the upper blade for performing shearing operations in cooperation with the lower blade;
rails supported on the ram at the back of the upper blade;
carrier means provided on said rails for horizontal movement along said rails;
means for moving said rails, said carrier means being pivotably connected to said moving means;
a back gauge supported on said carrier means at the level of the work-table for setting the dimension of the work-piece to be sheared; and
cam means mounted on said rails for pivoting the carrier means and the back gauge away from the level of the work-table such that the work-piece is free to move horizontally on the work-table without engaging the back gauge.

11. A shearing machine according to claim 10, including means for selectively positioning said cam means along said rails.

12. A shearing machine according to claim 10, wherein said means for moving said carrier means comprise leadscrews and nut members, said carrier means being pivotably connected to said nut members.

13. A shearing machine according to claim 10, including rollers on said carrier means engagable with said rails for movably guiding the carriers on said rails, said rollers being engagable with said cam means for pivoting the carrier means and back gauge away from the level of the work-table.

14. A shearing machine comprising:
a frame;
a work-table provided integrally on the frame;
a lower blade detachably fixed to the work-table;
an upper blade;
a ram supported on said frame for vertical movement with respect to said lower blade, said ram holding the upper blade for performing shearing operations in cooperation with the lower blade; and
hold-up means supported in said frame beneath said work-table, said hold-up means comprising a plurality of hold-up members engagable with a work-piece to be sheared, said hold-up members extending longitudinally of said lower blade and being articulatingly connected together in a row so that the hold-up means is able to bend in the longitudinal direction, said hold-up members being disposed at the back of the lower blade to upwardly hold up a work-sheet to be sheared in a manner such that said members are kept upwardly biased and can be moved up and down and can be tilted relative to one another longitudinally of and in compliance with the movements of the upper blade,
wherein the articulating connection between said hold-up members comprises a horizontal bore formed in one end of each of said hold-up members, a joint block fitting in said bore, and a bolt connecting said joint block to the adjacent hold-up member adjacent said bore.

15. The shearing machine of claim 14 wherein said bore is notched into a substantially semi-cylindrical shape.

16. The shearing machine of claim 14 further comprising a lower front plate fixed to said frame wherein each of said hold-up members is fixed to a carrier member mounted for slideable movement with respect to said lower front plate.

17. The shearing machine of claim 16 wherein each of said carrier members is formed with a C-shaped opening facing downwardly with respect to said frame and each of said hold-up members is fixed to the respective carrier member by bolts disposed in said C-shaped opening.

18. The shearing machine of claim 17 wherein a plurality of hydraulic motors having piston rods are provided for vertical movement of said hold-up members, with one end of said hydraulic motors being pinned to said lower front plate and the piston rods of said hydraulic motors being pinned to said carrier members.

19. The shearing machine of claim 17 further comprising a elongated guide plate fixed to said lower front plate and spaced apart therefrom by a plurality of spacer blocks, each of said spacer blocks being disposed between an adjacent pair of carrier members with said carrier members being slideable between said lower front plate and said elongated guide plate.

20. The shearing machine of claim 19 wherein one of said carrier members is pivotally connected to said lower front plate by means of a link which is pivotally pinned at one end to said carrier member and pivotally pinned at the other end between said lower front plate and said elongated guide plate.

* * * * *

UNITED STATES PATENT AND TRADEMARK OFFICE
CERTIFICATE OF CORRECTION

PATENT NO. : 4,679,473

DATED : July 14, 1987

INVENTOR(S) : TADASHI HIRATA et al

It is certified that error appears in the above-identified patent and that said Letters Patent is hereby corrected as shown below:

FRONT PAGE:

Foreign Application Priority Data:

Please add: Nov. 9, 1983 (JP) Japan 58-172282

Nov. 9, 1983 (JP) Japan 58-172283

Nov. 9, 1983 (JP) Japan 58-172284

IN THE SPECIFICATION:

Column 1, line 26, "work sheet" should be --work-sheet--.

Column 3, line 26, "C" should be --$\underline{C}$--;

line 39, after "projecting" insert --forewardly--.

Column 4, line 31, "C" should be --$\underline{C}$--;

line 41, "VE" should be --$\underline{VE}$--;

line 41, "H" should be --$\underline{H}$--;

line 46, "H" should be --$\underline{H}$--;

UNITED STATES PATENT AND TRADEMARK OFFICE
CERTIFICATE OF CORRECTION

PATENT NO. : 4,679,473

DATED : July 14, 1987

INVENTOR(S) : TADASHI HIRATA et al

It is certified that error appears in the above-identified patent and that said Letters Patent is hereby corrected as shown below:

IN THE SPECIFICATION:

Column 4, line 46, "C" should be --$\underline{C}$--;

line 48, "C" should be --$\underline{C}$--;

line 61, after "ram" insert --to--.

Column 5, line 25, "form" should be --from--.

Column 7, line 24, "damaging" should be --damaged--;

line 43, before "sucked" insert --be--;

line 55, "memebers" should be --members--.

Column 8, line 25, "bf" should be --of--;

line 61, delete "with".

Column 9, line 13, "diamter" should be --diameter--;

line 16, "diamter" should be --diameter--.

Column 10, line 1, "claim" should be --claims--.

UNITED STATES PATENT AND TRADEMARK OFFICE
CERTIFICATE OF CORRECTION

PATENT NO. : 4,679,473

DATED : July 14, 1987

INVENTOR(S) : TADASHI HIRATA et al

It is certified that error appears in the above-identified patent and that said Letters Patent is hereby corrected as shown below:

IN THE CLAIMS:

Claim 7, line 1, "claim 5" should be --claim 6--.

Signed and Sealed this

Twenty-sixth Day of January, 1988

Attest:

DONALD J. QUIGG

*Attesting Officer*  *Commissioner of Patents and Trademarks*